United States Patent [19]
Drasch et al.

[11] 4,227,783
[45] Oct. 14, 1980

[54] DEVICE FOR STOPPING OR FIXING MOVING OR MOBILE COMPONENTS

[75] Inventors: Josef Drasch; Gustav Firla, both of Vienna; Leopold Rollenitz, Totzenbach; Robert Scheiber, Wiener Neudorf, all of Austria

[73] Assignees: Karl Vockenhuber; Raimund Hauser, both of Vienna, Austria

[21] Appl. No.: 928,448

[22] Filed: Jul. 27, 1978

[30] Foreign Application Priority Data

Jul. 29, 1977 [CH] Switzerland ............... 009413/77

[51] Int. Cl.³ ............................................... G03B 1/22
[52] U.S. Cl. ................................ 352/194; 352/177; 352/225
[58] Field of Search .............. 352/177, 174, 207, 208, 352/225, 227, 194; 354/234

[56] References Cited

U.S. PATENT DOCUMENTS

| 1,125,662 | 1/1915 | Corbin et al. | 352/177 |
|---|---|---|---|
| 1,197,568 | 9/1916 | Weeks . | |
| 1,350,548 | 8/1920 | Darby | 352/227 |
| 3,397,937 | 8/1968 | Schrader | 352/179 |
| 3,533,345 | 10/1970 | Starp | 354/234 |
| 3,637,125 | 1/1972 | Freudenschuss | 352/194 |
| 3,694,065 | 9/1972 | Roth | 352/194 |
| 3,702,730 | 11/1972 | Russell | 352/194 |
| 3,779,633 | 12/1973 | Ichiyanagi | 352/177 |
| 3,907,413 | 9/1975 | Morell et al. | |
| 3,908,882 | 9/1975 | Wakahara | 352/194 |
| 4,078,765 | 3/1978 | Bogli | 352/194 |

FOREIGN PATENT DOCUMENTS

| 311804 | 3/1973 | Austria . |
| 311798 | 12/1973 | Austria . |
| 864053 | 12/1952 | Fed. Rep. of Germany . |
| 1016458 | 9/1957 | Fed. Rep. of Germany . |
| 2532563 | 2/1977 | Fed. Rep. of Germany . |
| 906783 | 1/1946 | France . |
| 829797 | 3/1960 | United Kingdom . |
| 878273 | 9/1961 | United Kingdom . |
| 1053014 | 12/1966 | United Kingdom . |
| 1240848 | 7/1971 | United Kingdom . |

Primary Examiner—Monroe H. Hayes
Attorney, Agent, or Firm—Fleit & Jacobson

[57] ABSTRACT

Thin walled components, which are moving or capable of movement, are stopped or clamped by the cooperation between an electromagnet core and an independent short-circuit component. The mobile component is always in contact with the core of the electromagnet and with the short-circuit component such that no noise is produced when the mobile component is stopped or clamped.

9 Claims, 5 Drawing Figures

DEVICE FOR STOPPING OR FIXING MOVING OR MOBILE COMPONENTS

BACKGROUND OF THE INVENTION

The invention relates to a device for the stopping, fixing or the like of moving or mobile components. Wherein such components are, preferably of small wall thickness, and the stopping or fixing being effected by means of a magnetic force.

Devices of this type are used for locking the actuating elements of magnetic tape apparatus of the type, for example, where the actuating elements are coupled to a slide which can be moved between a rest position and a working position. When the actuating element is operated manually, the slide is shifted with the actuating element and, when its end positions are reached, a switch is actuated. The switch is normally located in the circuit of an electromagnet. The slide is made from a ferromagnetic material and, if appropriate, is located in the magnetic field of the electromagnet. If the electromagnet has been excited via the switch, the slide is retained in this position. Unlocking of the slide takes place by deexcitation of the electromagnet, which in turn can be effected, for example, by means of the actuating element. In this type of device, the slide serves to regulate the different modes of operation of the apparatus.

One of the disadvantages of this known device is that the association of the slide with the electromagnet is in principle free. When the actuating element is operated and the electromagnet is excited, the slide is suddenly attracted to the core of the electromagnet, the slide striking the core with a large noise. In the case of apparatus which is used, for example, for recording or replaying sound information, this is a great disadvantage since this noise is troublesome, that is to say, microphone recordings in the same room are affected in a deleterious manner.

SUMMARY OF THE INVENTION

It is an object of the present invention to provide a device which avoids the disadvantages of the state of the art. In a device of the type described above, it is, therefore, proposed according to the invention that a magnetic short-circuit means, in the form of a separate component, be associated with the core of an electromagnet, with the mobile or movable component being located between the core and the short-circuit component. The core is in contact with one side of the mobile component and the short-circuit component is in contact with the other side of the mobile component. The result of these special measures is that the mobile component always bears against the core of the electromagnet. This has the result that no noise at all is produced when the electromagnet is excited. The air gap between the core and the mobile component is negligibly small. In this manner, the short-circuit component bears against the mobile component under a spring force so that a further advantage is provided whereby no noise is produced on deexcitation of the electromagnet. The core of the electromagnet and the short-circuit component are mutually opposite so that essentially a closed yoke is formed.

According to a further characteristic of the invention, it is provided that the regions of contact of the core with the mobile component and the regions of contact of the mobile component with the short-circuit component are provided in the form of a smooth contacting surface area.

According to a further embodiment of the invention, it is provided that a permanent magnet, equipped with pole shoes, is provided as the short-circuit component. Moreover, it is proposed, according to the invention, that mutually opposite poles of the electromagnet and of the permanent magnet have inverse polarities. However, it is also envisioned in the invention that mutually opposite poles of the electromagnet and of the permanent magnet may have the same polarity.

In a further development, according to the invention, it is also possible to provide arrangements for changing over the polarity of the electromagnet.

In a further particular feature according to the invention, the mobile component is made from a nonmagnetizable material. This material can be, for example, a plastic which has a low density coupled with high strength and dimensional stability so that the moving mass, i.e., the mobile component, can be kept small.

A further embodiment of the invention provides that, in a cine-apparatus, the mobile component is the film gripper itself or a lever, push-rod or the like, which actuates the gripper.

In a further development of the invention, it is proposed that the mobile component is an element which actuates the engagement stroke of the gripper into the perforation of a moving picture film. The two last-mentioned objects, according to the invention, make it possible to prevent the transport of the moving picture film by stopping or fixing the gripper outside the plane of the movie film, as a result of which, projection or the like can be achieved with an arbitrarily chosen picture frequency, if this stopping is carried out at predetermined intervals.

Finally, it is also proposed according to the invention that, in a cine-apparatus, in particular a moving picture camera, the mobile component is represented by the shutter or by a component which is frictionally connected to this shutter and preferably has a flat surface. Wherein the device is provided for stopping the shutter with the picture gate covered and/or with the picture gate opened, preferably for the purpose of a long time exposure.

A particular advantage of the invention is the short switching time, relative to presently known devices, which is required for stopping or fixing the mobile component. This switching time results primarily from the fact that there is virtually no air gap between the components of the device.

BRIEF DESCRIPTION OF THE DRAWINGS

The invention is diagrammatically represented by way of example in the drawings, in several embodiments.

DETAILED DESCRIPTION OF THE INVENTION

Figure 1:
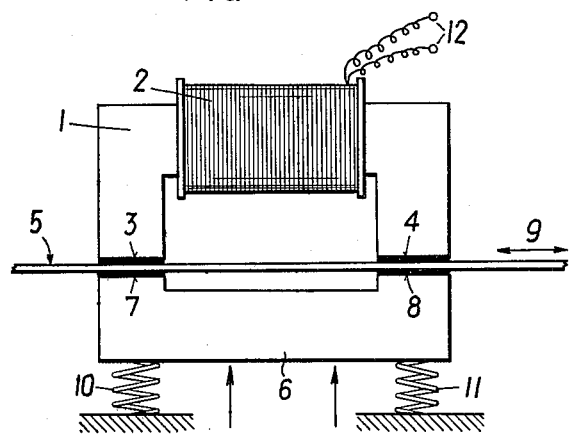
FIG. 1 shows a side view of a first embodiment of the device according to the invention.

In FIG. 1, 1 designates the core of an electromagnet which is associated with the electric coil 2. The core is U-shaped and its two pole surfaces 3 and 4 are in contact with the mobile component 5. The component 6 forms the magnetic short-circuit and its surfaces 7 and 8 are in contact with the underside of the mobile component 5. The mobile component 5 can be shifted in the directions shown by arrow 9, between the core 1 and the short-circuit component 6. The springs 10 and 11 are designed in such a way that the short-circuit component 6 exerts only a small pressure against the mobile component 5 and against the core 1. In principle, the core 1 is in contact with one side of the mobile component 5 and the short-circuit component 6 is in contact with the other side of the mobile component 5.

When a current is supplied via the terminal 12 to the electric coil 2, the short-circuit component 6 is attracted by the core 1 and thus presses the mobile component 5 against the pole surfaces 3 and 4 of the core 1. As a result of this, the mobile component 5 is stopped or clamped in its position at that instant. Since there is virtually no air gap between the core 1, the mobile component 5 and the short-circuit component 6, stopping takes place very quickly, for example, within a few microseconds. After the electromagnet 1, 2 has been deexcited, the mobile component 5 can be moved again. Due to the short switching time, stopping or fixing of the moving component 5 occurs almost instantaneously at the position it was in at the time current was supplied to the coil 2.

Figure 2:
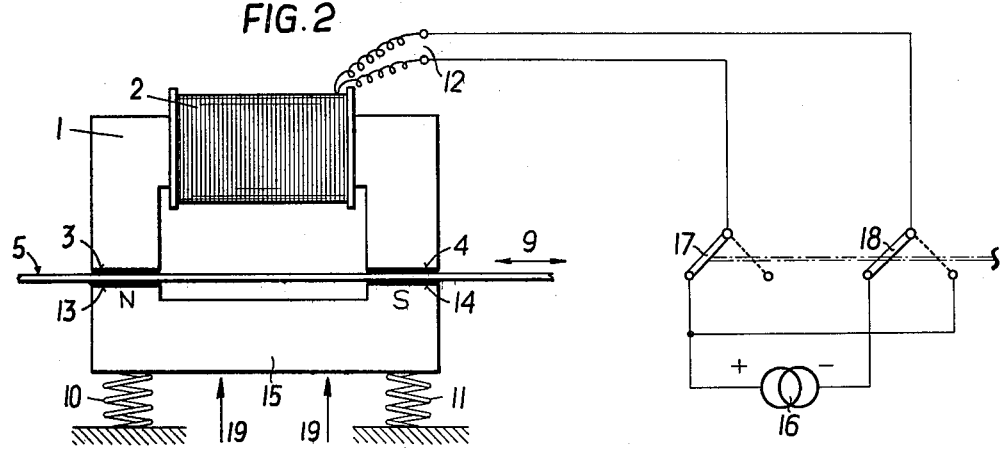
FIG. 2 is a side elevation and schematic of a second embodiment of a device according to the invention.

The device, according to FIG. 2, differs from the embodiment according to FIG. 1 inasmuch as the surfaces 7, 8 of the short-circuit component 6, according to FIG. 1, are designed as the pole shoes 13, 14 of a permanent magnet 15. The result of this is that, when the coil 2 is not connected to a current source, the component 15 presses against the mobile component 5 or against the core 1 and stops or fixes the mobile component 5.

In FIG. 2, 16 designates a current source which is connected via the switches 17 and 18, to the terminals of the electric coil 2. The switches 17 and 18 represent a pole-changer for the current supply to the electric coil 2. The following effects can be achieved by reversing the polarity of the magnetic field of the electric coil 2:

(a) If the pole surfaces 13 and 3, or 14 and 4 have the same polarity, the short-circuit component 15 is pressed away from the mobile component 5 against the direction of the arrows 19, and the component 5 is released.

(b) If the poles surfaces 13 and 3, or 14 and 4 have different polarities, a relatively strong attraction of the component 15 to the core 1 or the mobile component 5 takes place, and this leads to stopping of the moving component or fixing it.

(c) If a switch (circuit-breaker) is inserted into the wiring path of the current source 16, the electromagnet 1, 2 can be deexcited so that stopping or fixing of the mobile components 5 is effected merely by the permanent magnet 15.

The effects achieved using the electromagnet according to FIG. 1 can be amplified in a simple manner as a result of the association with the permanent magnet 15.

Figure 3:
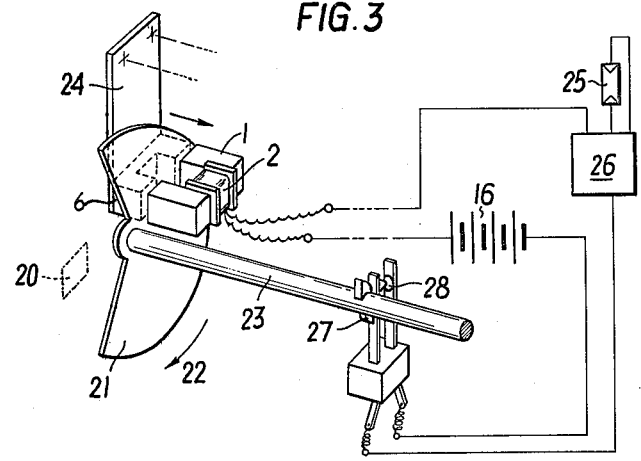
FIG. 3 shows a perspective view, partially schematic, of the application of the inventive device according to FIG. 1, for stopping the shutter in a moving picture camera.

FIG. 3 shows the application of the device according to FIG. 1, in a moving picture camera for shooting movie films. The revolving shutter 21, which is rotatable in the direction of the arrow 22, is located in front of the picture gate 20. For this purpose, the shutter 21 is solidly joined to the shaft 23, which is driven by a motor, which is not shown. The revolving shutter 21 represents the mobile component 5, as shown in FIG. 1. The electromagnet, consisting of the electric coil 2 and the core 1 is located on one side of the shutter 21 and the short-circuit component 6 is located on the other side of the shutter 21. The short-circuit component 6 is connected to the small spring-loaded plate 24, which is fixed, for example, to the system housing of the moving picture camera (not shown). The electromagnet 1, 2 and the short-circuit component 6 are positioned relative to the revolving shutter 21 in such a way that, when the electromagnet is not excited, the revolving shutter 21 can move substantially freely between the core 1 and the short-circuit component 6.

In the embodiment according to FIG. 3, the device 1, 2, 6 is intended to stop the shutter 21 in the correct position during so-called long time exposures. In the case of long time exposures, the picture frequency depends on the brightness of the scene, and the speed of rotation of the drive shaft 23 being in itself constant, or being equal to that of normal time exposures. As shown in FIG. 3, the shutter is held in position until a sufficiently large quantity of light has reached the light-sensitive layer of the moving picture film. This quantity of light is determined, for example, by the photoresistance 25 which is associated with the time-setting device 26 of the camera's exposure control device which is not shown. The time-setting device 26 also comprises a switching device for the electromagnet 1, 2. The electromagnet 1, 2 is always excited by the switching device of the time-setting device 26, when the revolving shutter 21 is in the position, at the angle of rotation as shown. In this manner, the short-circuit component 6, located on the small spring-loaded plate 24, is attracted by the core 1 and stops and fixes the revolving shutter 21. When a sufficiently long exposure has been carried out, the time-setting device 26 switches the current source 16 of the electromagnet 1, 2 off again, so that the locking of the revolving shutter 21 is cancelled. In order to ensure, however, that excitation of the electromagnet 1, 2 occurs only when the picture gate 20 is opened, a cam 27 is located on the drive shaft 23. This cam is associated with the switch contact 28, which is in series with the current source 16 for the electromagnet 1, 2. The switch contact 28 is open whenever the picture gate 20 is covered by the revolving shutter 21.

The core of the electromagnet 1, 2 can also have a different configuration. Thus, it would be conceivable to associate the electromagnet with the shutter 21 arranged concentrically to the drive shaft 23. It is likewise possible to employ a permanent magnet according to FIG. 2, in which case it is possible to achieve the effects (a) to (c) described under the embodiment according to FIG. 2. In place of the shutter 21, it would also be possible to provide an additional disc, solidly joined thereto, as the mobile component. Stopping of the shutter in the closed position, at the end of shooting a film, can also be effected by the electromagnet 1, 2. The latter would then have to be controlled, for example, by the release of the camera or the like. The mobile component 5 or the shutter 21 can be made from a nonmagnetizable material, such as, for example, a plastic or the like.

Figure 4:
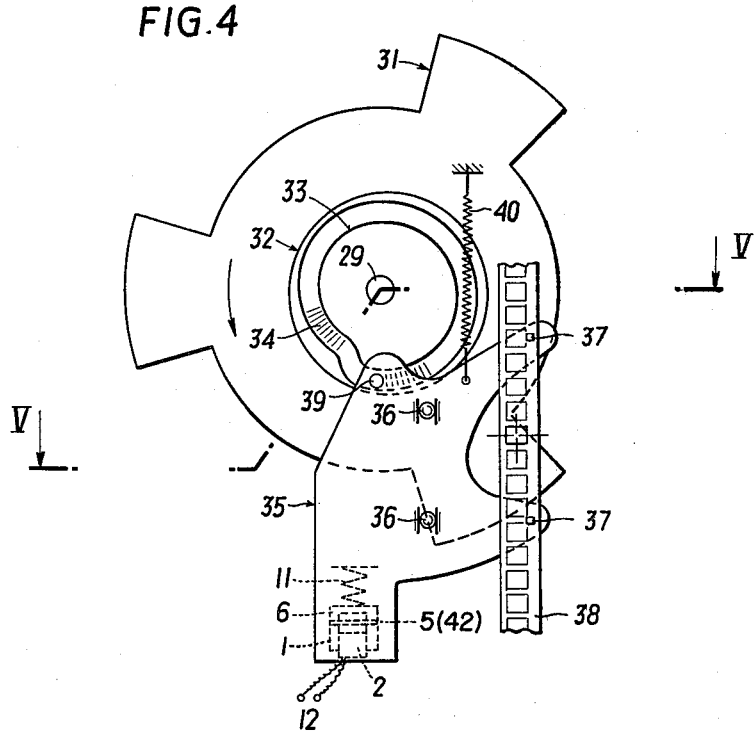
FIG. 4 is an elevation view illustrating the device according to the invention for controlling the gripper drive in a moving picture projector.
Figure 5:
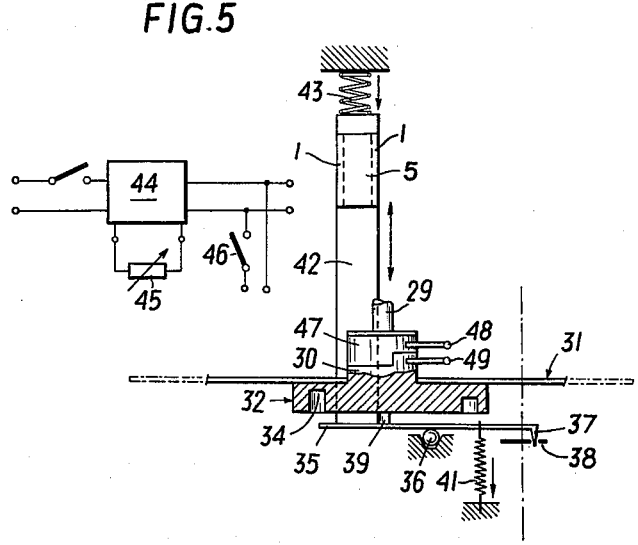
FIG. 5 is a cross-sectional view of the inventive device shown in FIG. 4, taken along site line 5—5.

In FIGS. 4 and 5, a gripper mechanism for a cinematographic apparatus is shown, which mechanism is equipped with a small gripper frame which is adjustable perpendicular to the plane of the film by the film or by a transverse lifting cam against the action of a spring and which, coincidental with the transport motion of the gripper, engages the gripper tooth in the perforation of the film or lifts it out of the perforation. The electromagnet is intended to prevent the engaging motion of the gripper.

In FIGS. 4 and 5, 29 designates the gripper shaft of the apparatus, which shaft is driven counterclockwise by a motor, in a manner which is not shown. On the shaft 29, a hub 30 is located, which carries a three-part diaphragm leaf 31 and a cam disc 32.

The cam disc 32 has a radial cam 33 and an axial cam 34. Opposite the cam disc 32 there is a small gripper frame 35 which can be shifted vertically on two balls 36 and which is pivotably mounted. The small gripper frame 35 has two gripper teeth 37, which interact with the perforations of the film 38 and transport the latter corresponding to the motion of the small gripper frame. A feeler 39 is provided on the small gripper frame 35, which feeler is pressed against the cam disc 32 under the action of a first spring 40 and a second spring 41. The small gripper frame 35 is moved to and fro in the vertical direction by the feeler 39, corresponding to the course of the radial cam 33, while the axial cam 34 has the effect of pivoting the small gripper frame 35, the gripper teeth 37 either being pressed into the the perforation of the film 38 or being lifted out of the latter.

A movable element 42, which forms the mobile component 5 according to FIG. 1, bears against the small gripper frame 35 under the force of the spring 43.

The mode of operation of the inventive device is essentially as follows: when the electromagnet 1, 2 is not excited, the film 38 is transported by the gripper mechanism. Immediately before the actual switch movement of the gripper, the gripper teeth 37 are made to engage in the perforation of the film by the axial cam 34. In the subsequent phase, the small gripper frame is shifted downwards by the radial cam 33, the gripper teeth 37 transporting the film 38 in the same direction. When the switch stroke has ended, the small gripper frame is pivoted by the axial cam 34, the gripper teeth 37 being disengaged from the perforation of the film 38. The small gripper frame is then returned into the starting position by the radial cam 18. When the switch 46 is closed and the electromagnet 1, 2 is continuously excited, the latter retains the small gripper frame 35 in the disengaged position, and no film transport takes place, while the small gripper frame 35 oscillates up and down. If the electromagnet 1, 2 is not continuously excited but excited only during every second transport phase, the film is projected at half the picture frequency. Moreover, since the diaphragm 31 continues to run at an unchanged speed, the light/dark frequency remains constant, so that a flicker is avoided.

To set the picture frequency, a pulse generator 44, having a pulse duration which is variable, e.g., by means of adjusting the time constant element 45, is provided in accordance with the embodiment of FIG. 5. The pulse generator 44 can be designed in the form of a relay circuit or as a multivibrator. In order to avoid a release of the small gripper frame 35 from the electromagnet 1, 2, when the feeler 39 is at a relatively large distance from the axial cam 34, it is advantageous to synchronize the pulse generator 44, relative to the phase position of the pulse transmitter, by means of a contactor 47 to 49 located on the hub 30. This enables the magnet 1, 2 to be switched off at that time when the feeler 39 of the small gripper frame is directly opposite the axial cam 34, so that the feeler strikes the cam at a very low speed and undesirable noise is thus prevented.

The use of the invention is not restricted to gripper systems, wherein the transverse motion is controlled by cams. Rather, it is also possible to fit so-called pawl grippers and drag grippers with corresponding magnet systems, in order to prevent the engaging motion of the gripper tooth in the film perforation.

It is also conceivable to use the device according to the invention together with the electromagnet, in a manner which is not shown, for controlling a tilting mirror when scanning a continuously driven moving picture film for the purpose of reproduction via television picture screens, in which case braking of the tilting motion of the mirror can be effected by the electromagnet. This is possible above all because the switching speed of the magnet is very high, as described at the outset.

According to the embodiments shown, the mobile component 5 or 42 essentially represent an armature for the magnet system 1, 2. This armature can be made from a non-magnetizable material, such as, for example, a plastic, a copper/beryllium sheet or the like, so that it is possible to attain a mass which is very small. This small mass is particularly desirable in the embodiment according to FIGS. 4 and 5. The power consumption for the electromagnet 1, 2 can also be kept small, which is particularly important for portable apparatus, such as moving picture cameras or the like.

In particular, when the magnet system is employed in moving picture projectors, slow-motion control at any desired picture frequency, can be achieved in a simple manner, by means of remote control.

The springs 11 of the short-circuit component, which are shown in the figures, can be provided either in the form of a leaf spring, or a spring plate, which is rigidly joined to the short-circuit component on one side and fixed to the apparatus on the other side. If the leaf spring here extends in the direction of the mobile component, or in the direction of motion thereof, the spring will also exert holding forces when the mobile component is stopped.

In principle it is also possible, particularly in the case of rotary mobile components, to arrange the magnet or the short-circuit part concentrically to one another.

It is understood, of course, that the foregoing description is given by way of example only, that many other embodiments are available according to the present invention, and that this description is not intended to limit the present invention, except as set forth in the following claims.

We claim:

1. In an intermittent drive apparatus for use in a cinematographic apparatus of the type for use with perforated film, said intermittent drive apparatus comprising: cam means for controlling transport of said film; claw means being controlled by said cam means and being adapted to transport said film, said claw means further being displaceable perpendicularly to the plane of said film to engage and disengage the perforation holes of said film in synchronism with the film-transport movement; biasing means urging said claw means in a direction for perforation engagement; electromagnetic means having an energized and a deenergized condition, wherein in said energized condition said electromagnetic means holds said claw means in a perforation disengaged position against the force of said biasing means;

the improvement wherein said intermittent drive apparatus further comprises movable element means for moving in an axial direction so as to follow the engaging and disengaging displacement of said claw means, said electromagnetic means comprising a core and a clamping member between which said movable element means is sandwiched, first additional biasing means for holding said movable element means at all times in contact with said core and said clamping member of said electromagnetic means, and second additional biasing means for holding said movable element means at all times in contact with said claw means.

2. A device according to claim 1, wherein said core of said electromagnetic means and said clamping member are arranged mutually opposite.

3. A device according to claim 1 or 2, wherein the regions of contact of the core with said movable element means and the regions of contact of said movable element means with the clamping member are in the form of flat surfaces.

4. A device according to claim 1 or 2, wherein said clamping member is a permanent magnet.

5. A device according to claim 4, wherein said clamping member is provided with pole pieces.

6. A device according to claim 4, wherein adjacent poles of said core of said electromagnetic means and of said permanent magnet have opposite polarities.

7. A device according to claim 4, wherein adjacent poles of said core of said electromagnetic means and of said permanent magnet have the same polarity.

8. A device according to claim 4, further comprising means for changing the respective polarities of said core and said permanent magnet of said electromagnetic means.

9. A device according to claim 1 or 2, wherein said movable element means is made from a non-magnetisable material.

* * * * *